United States Patent
Robinson et al.

(10) Patent No.: US 7,542,590 B1
(45) Date of Patent: Jun. 2, 2009

(54) SYSTEM AND METHOD FOR UPGRADING BIOMETRIC DATA

(75) Inventors: Timothy L. Robinson, Reston, VA (US); Bradford R. Schildt, Boulder, CO (US); Tennille V. Goff, Springfield, VA (US); Daniel J. Corwin, Ashburn, VA (US)

(73) Assignee: YT Acquisition Corporation, Delray Beach, FL (US)

( * ) Notice: Subject to any disclaimer, the term of this patent is extended or adjusted under 35 U.S.C. 154(b) by 609 days.

(21) Appl. No.: 10/840,239

(22) Filed: May 7, 2004

(51) Int. Cl.
*G06K 9/00* (2006.01)

(52) U.S. Cl. .................................... 382/115

(58) Field of Classification Search ......... 382/115–127, 382/315
See application file for complete search history.

(56) References Cited

U.S. PATENT DOCUMENTS

| | | | |
|---|---|---|---|
| 5,067,162 A | 11/1991 | Driscoll et al. | |
| 5,650,842 A | 7/1997 | Maase et al. | |
| 5,963,656 A | 10/1999 | Bolle et al. | |
| 6,018,739 A | 1/2000 | McCoy et al. | |
| 6,097,035 A | 8/2000 | Belongie et al. | |
| 6,133,943 A | 10/2000 | Needham | |
| 6,151,420 A | 11/2000 | Wober et al. | |
| 6,160,903 A | 12/2000 | Hamid et al. | |
| 6,256,737 B1 * | 7/2001 | Bianco et al. | 713/186 |
| 6,289,114 B1 | 9/2001 | Mainguet | |
| 6,317,544 B1 | 11/2001 | Diehl et al. | |
| 6,320,974 B1 | 11/2001 | Glaze et al. | |
| 6,397,198 B1 * | 5/2002 | Hoffman et al. | 705/44 |
| 6,529,871 B1 * | 3/2003 | Kanevsky et al. | 704/246 |
| 6,535,622 B1 | 3/2003 | Russo et al. | |
| 6,546,122 B1 | 4/2003 | Russo | |
| 6,560,741 B1 | 5/2003 | Gerety et al. | |
| 6,597,802 B1 | 7/2003 | Bolle et al. | |
| 6,611,629 B2 | 8/2003 | Bender et al. | |
| 6,657,667 B1 | 12/2003 | Anderson | |
| 6,681,034 B1 | 1/2004 | Russo | |
| 6,850,147 B2 * | 2/2005 | Prokoski et al. | 340/5.53 |
| 6,853,739 B2 * | 2/2005 | Kyle | 382/115 |
| 6,898,299 B1 * | 5/2005 | Brooks | 382/115 |
| 6,917,902 B2 | 7/2005 | Alexander | |
| 6,928,547 B2 * | 8/2005 | Brown et al. | 713/186 |
| 6,937,135 B2 * | 8/2005 | Kitson et al. | 340/5.52 |
| 6,970,584 B2 | 11/2005 | O'Gorman et al. | |
| 7,020,308 B1 | 3/2006 | Shinzaki et al. | |
| 7,103,200 B2 * | 9/2006 | Hillhouse et al. | 382/115 |
| 7,155,039 B1 * | 12/2006 | Lo | 382/124 |

(Continued)

FOREIGN PATENT DOCUMENTS

WO    WO 91/08555    6/1991

(Continued)

OTHER PUBLICATIONS

James P. Holmes et al. A Performance Evaluation of Biometric Identification Devices. Sandia Report. Jun. 1991.

*Primary Examiner*—Matthew C Bella
*Assistant Examiner*—Dennis Rosario
(74) *Attorney, Agent, or Firm*—Pepper Hamilton LLP (57) ABSTRACT

A system and method of improving biometric information registered in a biometric authorization system is disclosed. System user biometric information entered into the system is upgraded at subsequent biometric authorizations at numerous biometric input devices.

11 Claims, 4 Drawing Sheets

U.S. PATENT DOCUMENTS

| | | |
|---|---|---|
| 2001/0019636 A1 | 9/2001 | Slatter |
| 2002/0012455 A1 | 1/2002 | Benckert |
| 2002/0154793 A1 | 10/2002 | Hillhouse et al. |
| 2003/0068072 A1 | 4/2003 | Hamid |
| 2003/0126448 A1 | 7/2003 | Russo |
| 2004/0013288 A1 | 1/2004 | Svensson et al. |
| 2004/0015243 A1 | 1/2004 | Mercredi et al. |
| 2004/0086157 A1* | 5/2004 | Sukegawa .................. 382/115 |

FOREIGN PATENT DOCUMENTS

| | | |
|---|---|---|
| WO | WO 91/08555 A1 | 6/1991 |

* cited by examiner

SYSTEM AND METHOD FOR UPGRADING BIOMETRIC DATA

FIELD OF THE INVENTION

This application relates generally to upgrading biometric data. More particularly, the present invention relates to a system and method of upgrading previously registered biometric data.

BACKGROUND OF THE INVENTION

Generally, biometric authorization systems that provide authentication and verification services do so based upon biometric data collected from a system user during enrollment. The biometric information is registered with the biometric authorization system. The biometric data collected at the time of enrollment may not be the highest quality data, yet such data obtained at enrollment is employed to verify the user at subsequent biometric authorizations. In this authorization process, a mathematical representation of a user's biometric sample taken during the transaction process, known as a biometric template, is compared to the biometric template that was previously registered. A match between the received and the registered biometric templates produces a successful authorization. As would be appreciated, one of the key components that affect the effectiveness of the authorization system is the accuracy in the authentication or verification process. While false positives are certainly problematic, false negatives can be especially damaging because they directly impact a user's confidence in the usability of the biometric authorization system. What is needed therefore is a mechanism that enables the authorization system to ensure the highest possible correct identifications of system users.

SUMMARY OF THE INVENTION

The present invention addresses the aforementioned needs by providing systems and methods of upgrading user biometric data previously registered with a biometric authorization system. The present invention provides a flexible process by which registered biometric information is upgraded to ensure user convenience and biometric authorization accuracy.

DETAILED DESCRIPTION

Additional objects and advantages of the present invention will be apparent in the following detailed description read in conjunction with the accompanying drawing figures.

Since registered biometric data is at the heart of the authorization system, problems with the registered biometric data can have far-reaching effects. One such problem is that biometric data obtained at enrollment may not be the best example of a system user's biometric. For example, the biometric device may obtain only a partial sample and, thus, the template generated from the partial sample will be incomplete. This may occur for various reasons, such as a simple misalignment of a user's finger on a biometric input device. While this partial image may be enough for enrollment, it may cause problems at subsequent biometric authorizations. In particular, the user may be falsely rejected because the authorization system cannot correctly match his biometric with the registered biometric data. Additionally, the authorization system may produce a false positive by mistakenly matching one user with another user's record if the two have overlapping partial sample data.

In other scenarios, biometric data might also be of poor quality if it was acquired by a low-quality biometric scanning device. This poor quality data may cause similar problems to those encountered with partial biometric sample data. This problem could be significant when a centralized enrollment location is used due to the wide range of biometric input devices (BIDs) that may be employed at various enrollment locations. Each location may have a different biometric input device, ranging from high caliber models to ones of lesser quality. A centralized enrollment location may monitor the type of biometric input device employed. However, such an arrangement limits user access and, thus, may be prohibitive to acquiring new system users. In accordance with the present invention, a system can be configured to upgrade biometric information at numerous biometric authorization stations, thereby providing easy access while utilizing the highest quality biometric information available.

In conventional biometric authorization systems, a user would typically need to reenroll in the system to improve his biometric data. This can be a time consuming and aggravating process. Consequently, if a user's enrollment biometric data does not enable proper functioning of the authorization system, the user is more likely to discontinue using the authorization system rather than reenrolling. This problem hinders the widespread adoption of the biometric authorization system.

The present invention may be configured to upgrade biometric information when presented with superior biometric data at any biometric authorization station in the system. In this manner, if a user registers biometric data at a low-grade biometric input device, his registered biometric data may be improved when he later performs a biometric authorization at a higher grade device. By means of illustration and not limitation, a system user may enroll in a biometric authorization system at a grocery store utilizing an older model BID and then improve his registered biometric data while employing an advanced BID during a biometric transaction at a bank.

Some biometric systems have sought to alleviate the problem of inferior biometric data registration by having the user provide multiple scans of a biometric at enrollment. These multiple scans are either stored in association with the user's record or are combined to create composite biometric data. However, storing multiple scans of a system user's biometric may place an added demand on the system and may slow the biometric authorization process. While creating composite biometric data upon enrollment may lessen the burden of the system at subsequent transactions, it slows the enrollment process. In regards to customer service, these processes are an unappealing alternative. They require the customer to spend an excessive amount of time enrolling in the system and fail to display a biometric authorization system as one of convenience. By contrast, a system configured to upgrade user biometric information at subsequent authorizations provides an efficient enrollment process, while maintaining excellent biometric quality.

The principles of the present invention allow for periodic upgrading of user records subsequent to enrollment. In this process, the biometric data obtained in a biometrically-authorized transaction can be used to upgrade user biometric data stored in a system database. The periodic biometric upgrades allow the system to improve a system user's biometric data transparently during the normal course of usage of the biometric authorization system. As will be described in greater detail below, the process may be initiated in a variety of ways. In one scenario, a user may initiate a session with the biometric authorization system for the sole purpose of upgrading his registered biometric data. In another scenario, a biometric upgrade transaction may be initiated passively in conjunction with a conventional biometric authorization transaction. Additionally, the system may retrieve biometric data from third party sources to improve the system user's biometric information. Prior to describing a biometric data upgrade process, a description is provided of a sample environment in which the biometric authorization system operates.

A user conducts authorizations in the system by presenting biometric data that is compared to registered biometric data stored at the system database. Matching user biometric data to registered biometric data enables the retrieval of information stored in association with the registered biometric and/or approval of a transaction request depending on the action the user requests in the system. There are two main types of biometric comparison systems: biometric verification systems, wherein the system performs a "one-to-one" comparison of an individual's biometric to a record of his biometric, and biometric recognition systems, wherein the system performs a "one-to-more than one" biometric comparison of an individual's biometric to his biometric record and at least one other biometric record. A "one-to-one" biometric comparison verifies that the individual presenting the biometric is who he says he is, and a "one-to-more than one" biometric comparison recognizes an individual's biometric from a group of two or more biometrics. For the purposes of this application, "biometric system" is intended to refer to both verification and recognition biometric systems. As would be appreciated, the invention methods and their related methods of biometric comparison disclosed herein should not be used to limit the scope of the invention. The scope of the invention should allow for varying combinations of methods and their related methods of biometric comparison.

Additionally, this invention is not limited to using one form of biometric. For example, the biometric data referred to throughout this description might refer to an image of a biometric and/or a mathematical representation of the biometric data, often referred to as a "template" in terms of biometric applications. In one example, a biometric template can represent any data format that includes feature, positional, or other representing information of characteristics of biometric data. Alternatively, a template may be a mathematical representation of more than one biometric. For example, a user template may be generated from biometric data acquired from two individual fingers, such as a thumb and index finger, or from a finger and an iris scan.

Figure 1:
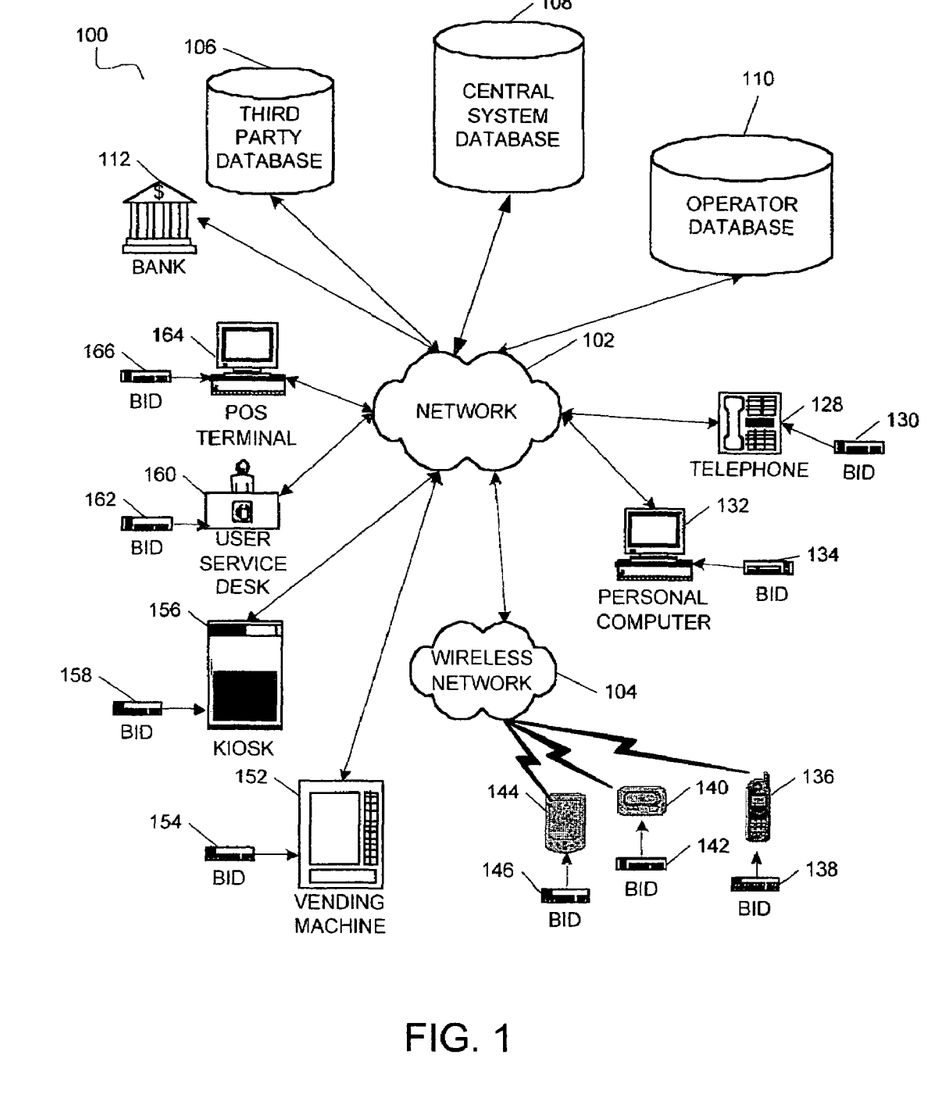
FIG. 1 illustrates an overview of the general architecture of a system for upgrading system user biometric information according to an embodiment of the present invention.

FIG. 1 illustrates a general architecture overview of an identity verification system 100 that is based on biometric authorization. The methods of the present invention may be employed in a variety of systems, including, but not limited to, an open, closed, or selectively shared system. An open system allows biometric upgrade transactions at any biometric authorization station in the system because an open system shares system user information stored in the centralized system database 108 with all biometric authorization stations. In an alternate embodiment, the system is configured as a closed system, meaning information entered into the system via a specific operator device is transmitted to and stored in a system database specific to that operator 110, and this information is not shared with other biometric authorization stations or other system databases. In a further embodiment, the system is configured as a selectively shared system. This system allows a chain of system operators owned by the same entity or linked in some other manner to share system user biometric information amongst them without sharing that data with all other non-designated system operators registered in the system. In addition to the systems described above, the methods of the present invention may transpire locally or centrally, as will be detailed further.

Figure 2:
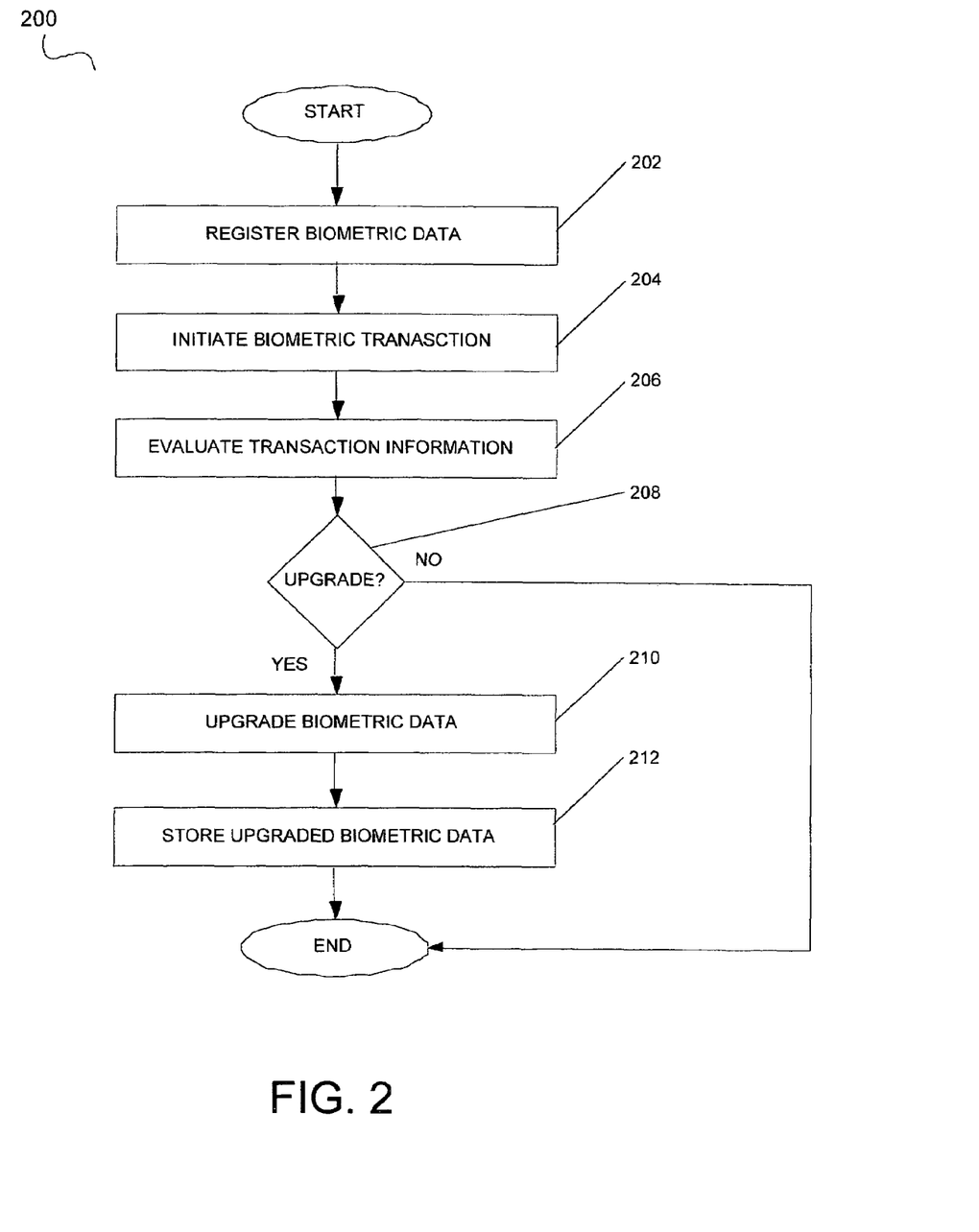
FIG. 2 illustrates a flowchart of the general process for upgrading system user biometric data.

Referring to FIG. 2, a flowchart of the general process for upgrading system user biometric data is illustrated. It is a feature of the present invention that the upgrading of user biometric data may occur during any biometric transaction. In one scenario, the biometric transaction may represent the biometric authorization that is required for a financial transaction, an age-restricted transaction, an authorization of identity verification transaction, physical or virtual access, or the like. In general, the biometric upgrade process may be designed to function transparently from the user's perspective. In an alternate scenario, the biometric transaction may represent a transaction for the specific purpose of upgrading a user's biometric data. By way of illustration and not limitation, the biometric sample may be a fingerprint, retinal scan, iris scan, facial scan, voice scan, DNA scan, hand architecture, or the like.

At step 202, a system user registers his biometric data with the system. Depending on the embodiment of the invention, the biometric information is stored at one or more of a central database 108, an operator database 110, or a third party database 106. As illustrated in FIG. 1, a user may register his biometric information at a variety of biometric authorization stations. A biometric authorization station comprises at least one biometric input device (BID). Examples of such stations are, but are not limited to, a personal computer 132 and a BID 134, a kiosk 156 and a BID 158, a user service desk 160 and a BID 162, or a point of sale terminal 164 and a BID 166. Alternatively, a biometric upgrade may transpire at other biometric authorization stations such as a telephone 128 and a BID 130, a cell phone 136 and a BID 138, a pager 140 and a BID 142, a personal wireless device 144 and a BID 146, or a vending machine 152 and a BID 154. BIDs are illustrated in FIG. 1 as peripheral devices for purposes of emphasis only. The system should not be so limited and may certainly incorporate devices with integrated BIDs.

Once a user's biometric data is registered, it may be advantageous to upgrade the biometric data at various points in time (e.g., periodic updates) to increase the accuracy of future authorizations. As noted, this upgrade process may be initiated during any biometric transaction in which a new biometric sample is presented to the system. In one scenario, the biometric transaction is a request for a biometric financial transaction via a financial institution 112 linked to the network 102. After a biometric transaction is initiated at step 204, the biometric transaction information is evaluated at step 206. In various embodiments, this evaluation process may consider any portion of the biometric transaction information (e.g., biometric sample, BID type, etc.) to determine whether the biometric data would be useful to upgrade the previously registered biometric data. If it is determined, at step 208, that the previously registered biometric data should not be upgraded, then the upgrade process ends. Alternatively, if it is determined, at step 208, that the previously registered biometric data should be upgraded, then the upgrade process continues at step 210, where the previously registered biometric data is upgraded. At step 212 the upgraded biometric data is stored with the system user record at one or more central database 108, operator database 110, and/or third party database 106.

The system may be configured to upgrade at multiple times. By way of illustration and not limitation, the system may be configured to allow merchants to send in a daily batch of upgrade transactions.

Once the user biometric data has been upgraded, the system may use it to generate a new biometric template for use with future biometric authorizations. In one embodiment, the previously stored biometric data/template is marked inactive. Optionally, one or more of the biometric templates may be stored in association with the system user record. An archive of previously registered data/templates would ensure that the system could switch back to a previously registered data/template should the new one prove deficient in any manner. Alternatively, the previously stored biometric data/template is deleted.

In one embodiment of the present invention, the biometric upgrade process is initiated by a third party. This process may be prompted by a system user, a system operator, or may be automated by the system itself. The database 108, 110 is linked to the third party database 106 via the network 102. The third party database 106 may be for example a driver registration database, storing information on registered drivers. During a biometric transaction, the system may initiate the retrieval of information from a third party database 106 in which biometric data is held. This biometric data may then be used to upgrade the biometric data registered in the database 108, 110.

A biometric upgrade process may periodically occur as a scheduled event determined either by a system user, a system operator, or a third party operator; a transaction initiated by a system user; a transaction initiated by a system operator; a transaction initiated by a third party; or at each biometric authorization.

Figure 3:
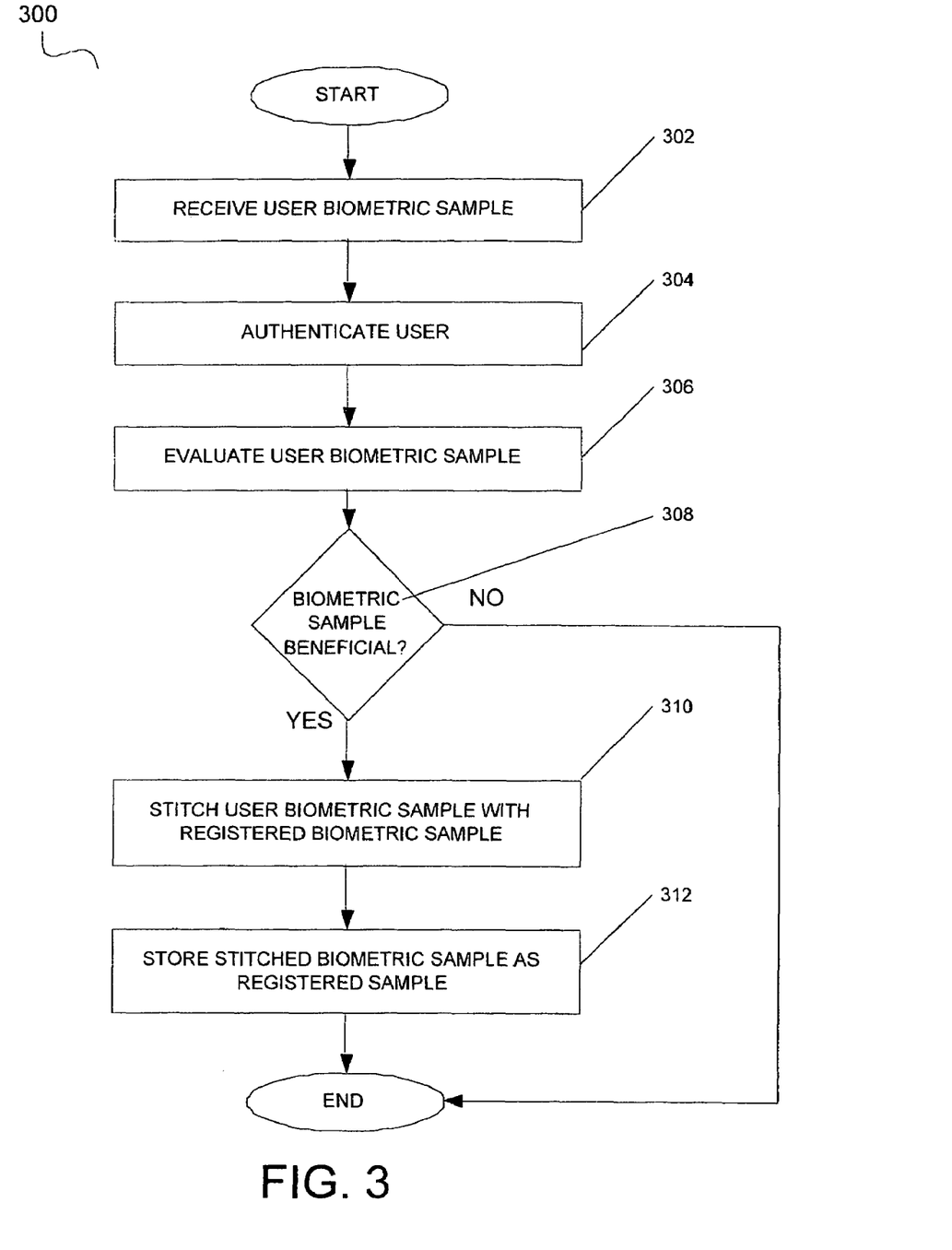
FIG. 3 illustrates a flowchart of a process for upgrading system user biometric information according to biometric sample stitching.

FIG. 3, illustrates a flowchart of a process for biometric upgrade via biometric sample stitching. Biometric sample stitching generally includes any method of combining all or part of prior biometric sample(s) with all or part of a new biometric sample to generate a new composite biometric sample. In this process, for example, two partial biometric samples may be used to generate a new more complete biometric sample.

At step 302, a newly generated biometric sample is received at a database 106, 108, 110. This sample may be sent from a variety of biometric authorization stations or a third party database 106, such as illustrated in FIG. 1.

At step 304, the received biometric sample is used to authenticate the user as part of a biometric transaction. At step 306, the newly generated biometric sample is then evaluated. By means of illustration and not limitation, if the biometric sample is a fingerprint scan, the evaluation may determine if the received sample has minutia points not exhibited in the registered biometric sample. Fingerprint minutia points may be ridge endings or ridge bifurcations where a ridge splits into two.

If it is determined, at step 308, that the biometric sample is not beneficial for a biometric upgrade, then the process ends. Alternatively, if it is determined, at step 308, that the biometric sample is beneficial for a biometric upgrade, then the process continues. As illustrated by step 310, the system user's biometric sample and his registered biometric sample are stitched or otherwise combined to create a new, more comprehensive biometric sample. Various methods for composite sample/template generating, such as composite fingerprint image generation, are well known in the art. At step 312, this new biometric data is then stored in the user record and the newly generated biometric sample is marked as the currently registered biometric sample. The previously registered biometric sample is marked inactive and is stored at the database 108, 110 with the user record or is stored at a third party database 106. In an alternative embodiment, the previously registered biometric sample is deleted.

In general, the process of combining a newly generated biometric sample with a previously registered sample enables the biometric authorization system continually to improve the quality of the registered biometric. In particular, this upgrade process will ensure that the registered biometric sample continually represents a current and complete scan of the user's sample rather than a partial scan that was obtained during enrollment. As noted, it is a feature of the present invention that this upgrade process may occur transparently during normal system usage without requiring a user to reenroll completely in the system.

In one embodiment of the present invention, the system stitches biometric templates. As previously mentioned, a template is a mathematical representation of one or more biometric samples. During enrollment, a user's biometric sample may be employed to generate a biometric template, which, in turn, is stored in the user record as the registered template. This biometric template is employed during biometric transactions to grant biometric identification and verification. At subsequent biometric transactions, the system may obtain a biometric sample deemed beneficial for upgrading. This sample is then employed to generate a biometric template, referred to as the received biometric template. The received biometric template and one or more registered biometric templates are combined to generate a new template, as known within the art. This newly stitched biometric template is then stored as the registered template in association with the user record at a database 106, 108, 110. The previously registered template is either archived or deleted as determined by various system parameters.

Figure 4:
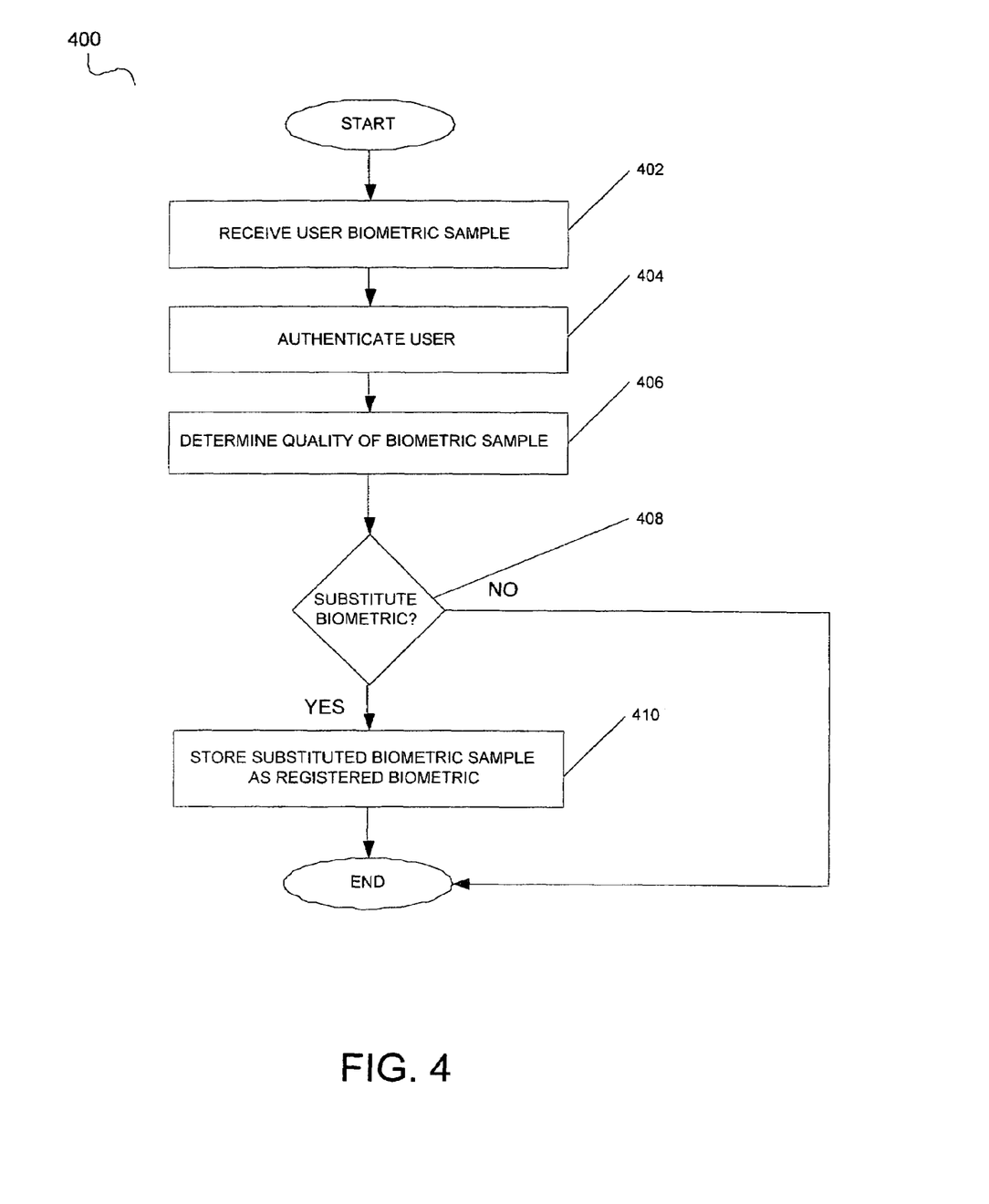
FIG. 4 illustrates a flowchart of a process for upgrading system user biometric information according to biometric sample substitution.

As an alternative to the stitching upgrade process of FIG. 3, a biometric sample upgrade may also be accomplished by a complete replacement of the registered biometric. FIG. 4 illustrates a flowchart for a biometric upgrade by means of biometric sample substitution. This biometric substitution may be based on a determination of the quality of the biometric sample. At step 402, a newly generated biometric sample is received. At step 404, the received biometric sample is used to authenticate the user as part of a biometric transaction.

At step 406, the quality of the received biometric sample is then evaluated at a database 106, 108, 110. In one embodiment, this evaluation may be based on an examination of the biometric sample itself. In an alternative embodiment, this evaluation may be based on external factors such as the scanning device that was used to generate the biometric sample. As an example, the system may simply determine whether the biometric sample was generated by a scanning device that was of a quality higher than the scanning device used to generate the previously registered biometric sample (e.g., the enrollment sample). In one embodiment, the determination may be based upon a variety of parameters. These parameters include but are not limited to number of sample minutia points, biometric sample clarity, biometric sample size, biometric sample liveness, system attendant biometric sample certification, and BID data. BID data includes, but is not limited to, one or more of a terminal identification code, a system attendant code, a system operator identification code, biometric authorization station transmission capabilities, BID type, BID quality and other biometric scan capabilities.

As mentioned, a biometric sample may be evaluated based upon system attendant biometric sample certification. If a system attendant is present during the acquisition of a biometric sample, he may certify the quality of the received biometric sample. An attendant-certified biometric sample may be deemed higher quality than a non-certified sample. Additionally, a system attendant may be assigned a ranking that determines his skill with the biometric system. A biometric sample certified by an attendant with a high skill ranking may be deemed superior to a biometric sample certified by an attendant of a lower ranking. The attendant's ranking may be included with the biometric sample, with a system attendant code, or stand on its own.

Monitoring one or more of these parameters would thereby enable the system to determine effectively the quality of the newly generated biometric sample. If it is determined, at step 408, that the newly generated biometric sample would not be suitable for biometric sample substitution, then the process ends. Alternatively, if it is determined, at step 408, that the newly generated biometric sample is suitable for biometric sample substitution, then the process continues to step 410 where the received biometric sample substitutes the previously registered biometric sample and is stored at the database 106, 108, 110 as the new registered biometric sample. The previously registered biometric sample may then be marked as inactive. Alternatively, the previously biometric sample may be deleted.

As mentioned, the processing of the present invention may occur at a database 106, 108, 110, but it may also transpire at other locations. In an alternate embodiment, the system is configured to function in a "local" system. A local system is configured to perform one or more biometric authorization steps at a biometric authorization station.

The biometric sample is received at a biometric authorization station. In addition to the biometric sample, a system identification code (SID) may be received. The biometric authorization station pulls the user's registered biometric data from a database 106, 108, 110. In one embodiment, the SID is employed to locate the user's registered biometric at a database 106, 108, 110. Once the user's registered biometric data is located, it is sent to the biometric authorization station for authentication. The received biometric data is compared to the registered biometric data. If the biometric data match sufficiently to meet a system threshold, the user is approved for the biometric transaction and the biometric upgrade proceeds. The biometric authorization station evaluates the received biometric data and determines if it is beneficial. If so, the biometric upgrade process proceeds. The upgrade process may transpire at the biometric authorization station or a database 106, 108, 110. After the biometric data has been upgraded, the upgraded biometric data is stored in association with the user record as the registered biometric data at a database 106, 108, 110. The previously registered biometric data is either archived or deleted.

As noted, the biometric upgrade may transpire when the system recognizes that the biometric transaction is occurring at a superior device. In one embodiment, the received biometric data and the BID data are sent to a database 106, 108, 110, which in turn evaluates the BID data. Additionally, a system user's SID may be sent in conjunction with or instead of the received biometric data. If the BID data denotes a biometric input device superior to the one used to obtain the registered biometric data, then the registered biometric data is sent to the current BID. The received biometric data is compared to the registered biometric data. If the received biometric data is determined to be superior, the received biometric data is then stored at the database and marked registered. The previously registered biometric data is marked inactive and stored or deleted.

In an additional embodiment of the present invention, during an upgrade transaction, the system may encourage the user to provide multiple biometric scans to establish more complete registered biometric data. For example, the system may prompt the user to provide a scan of the right, left and center portion of their fingerprint upon a flat, optical scanner. The system would then use these scans to generate the user's registered biometric data. Alternatively, the system may prompt the user to continue to provide biometric scans until a determined amount of biometric data has been acquired. In another embodiment, the user is encouraged to provide multiple scans upon enrollment in a biometric system.

A system and method of upgrading biometric data has been illustrated. It will be appreciated by those skilled in the art that the system and method of the present invention can be used to perform periodic and transparent biometric upgrades. It will thus be appreciated by those skilled in the art that other variations of the present invention will be possible without departing from the scope of the invention disclosed.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the above description should not be considered to be exclusive of these other embodiments. Also, it is to be understood that the phraseology and terminology employed herein are for the purposes of description and should not be regarded as limiting.

What is claimed is:

1. A method in a biometric authorization system, the method comprising:
  receiving, from a first biometric device, biometric data that is based on biometric information that is taken from a user and first biometric device data indicative of a capability of the first biometric device;
  locating registered biometric data associated with a user record, wherein the registered biometric data was obtained via a second biometric device;
  determining whether the received biometric data sufficiently matches the registered biometric data; and
  in response to the received biometric data sufficiently matching the registered biometric data:
    locating second biometric device data indicative of a capability of the second biometric device,
    determining whether the first biometric device data indicates that the capability of the first biometric device is superior to the capability of the second biometric device, and
    in response to the first biometric device data indicating that the capability of the first biometric device is superior to the capability of the second biometric device:
      generating upgraded biometric data based on a combination of the registered biometric data and said received biometric data, and
      storing the upgraded biometric data in said user record.

2. The method of claim 1, further comprising prompting said user for one or more additional biometric samples to employ for said generating upgraded biometric data.

3. The method of claim 1, wherein said received biometric data comprises a biometric template generated from said biometric information taken from said user.

4. The method of claim 1, further comprising receiving a user identification code.

5. The method of claim 1, wherein said generating upgraded biometric data is initiated by a third party system.

6. The method of claim 1, wherein said storing is determined by the system.

7. The method of claim 1, wherein said storing comprises storing a plurality of biometric data upgrade transactions.

8. The method of claim 1, further comprising comparing, at a local biometric device, said received biometric data with said biometric data associated with said user record.

9. The method of claim 1, further comprising comparing, at a central database, said received biometric data with said biometric data associated with said user record.

10. A method in a biometric authorization system, the method comprising:

receiving, at a database, biometric data that is based on biometric information taken from a user at a first biometric device and first biometric device data indicative of a capability of the first biometric device;

locating, at said database, registered biometric data associated with a user record, wherein the registered biometric data was obtained via a second biometric device;

authorizing said user at said database, said authorization being based on a comparison using said received biometric data and the registered biometric data associated with said user record;

upon a successful authorization, locating second biometric device data indicative of a capability of the second biometric device;

determining whether the first biometric device data indicates that the capability of the first biometric device is superior to the capability of the second biometric device; and in response to the first biometric device data indicating that the capability of the first biometric device is superior to the capability of the second biometric device:

upgrading said registered biometric data associated with said user record using said received biometric data, and storing the upgraded biometric data in association with said user record.

11. The method of claim 10, wherein said locating is based on a receipt of a user identification code.

* * * * *